United States Patent
Suh et al.

(10) Patent No.: US 10,299,280 B2
(45) Date of Patent: May 21, 2019

(54) SYSTEMS AND METHODS FOR INTERFERENCE ALIGNMENT IN WI-FI

(71) Applicant: Huawei Technologies Co., Ltd., Shenzhen (CN)

(72) Inventors: Jung Hoon Suh, Kanata (CA); Osama Aboul-Magd, Kanata (CA); Kwok Shum Au, Shenzhen (CN); Sheng Sun, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 315 days.

(21) Appl. No.: 14/961,602

(22) Filed: Dec. 7, 2015

(65) Prior Publication Data

US 2016/0088637 A1    Mar. 24, 2016

Related U.S. Application Data (63) Continuation of application No. 13/938,058, filed on Jul. 9, 2013, now Pat. No. 9,226,302.

(Continued)

(51) Int. Cl.
*H04W 72/08* (2009.01)
*H04W 72/12* (2009.01)
(Continued)

(52) U.S. Cl.
CPC ........ *H04W 72/082* (2013.01); *H04B 7/0626* (2013.01); *H04L 1/0009* (2013.01);
(Continued)

(58) Field of Classification Search
None
See application file for complete search history.

(56) References Cited

U.S. PATENT DOCUMENTS

| 2008/0025336 A1 | 1/2008 | Cho et al. |
| 2008/0075033 A1 | 3/2008 | Shattil |

(Continued)

FOREIGN PATENT DOCUMENTS

| CN | 102457951 A | 5/2012 |
| EP | 1804424 A1 | 7/2007 |
| GB | 2466469 A | 6/2010 |

OTHER PUBLICATIONS

"Draft Standard for Information Technology—Telecommunications and information exchange between systems—Local and metropolitan area networks—Specific requirements: Part 11: Wireless LAN Medium Access Control (MAC) and Phyical Layer (PHY) specification," IEEE P802.11ac/D3.0, Oct. 2012, 385 pages.

(Continued)

*Primary Examiner* — Chirag G Shah
*Assistant Examiner* — Suk Jin Kang
(74) *Attorney, Agent, or Firm* — Slater Matsil, LLP (57) ABSTRACT

System and method embodiments are provided for interference alignment in a wireless local area network (LAN) with an overlapping basic service set (OBSS). In an embodiment, a method includes instructing a first access point (AP) in the wireless LAN to broadcast a null data packet (NDP) sounding packet to a plurality of stations when no other AP is broadcasting, wherein the NDP sounding packet comprises a plurality of long training field (LTFs), and wherein a total number of LTFs is equal to a total number of transmission streams, receiving channel beamforming (BF) information and a signal plus interference to noise ratio (SINR) from each of the stations, wherein each of the stations computes the channel BF information and the SINR from sounding packets received from each of the APs in the wireless LAN, and determining a transmission schedule according to the SINRs and the channel BF information.

27 Claims, 8 Drawing Sheets

Related U.S. Application Data (60) Provisional application No. 61/718,031, filed on Oct. 24, 2012, provisional application No. 61/693,103, filed on Aug. 24, 2012.

(51) Int. Cl.
| | |
|---|---|
| *H04B 7/06* | (2006.01) |
| *H04L 1/00* | (2006.01) |
| *H04L 25/02* | (2006.01) |
| *H04L 27/26* | (2006.01) |
| *H04W 84/12* | (2009.01) |

(52) U.S. Cl.
CPC ...... *H04L 25/0228* (2013.01); *H04L 27/2646* (2013.01); *H04W 72/1226* (2013.01); *H04W 72/1231* (2013.01); *H04W 84/12* (2013.01)

(56) References Cited

U.S. PATENT DOCUMENTS

| | | |
|---|---|---|
| 2010/0248635 A1 | 9/2010 | Zhang et al. |
| 2011/0273977 A1 | 11/2011 | Shapira et al. |
| 2011/0274002 A1 | 11/2011 | Pare, Jr. et al. |
| 2011/0274003 A1 | 11/2011 | Pare, Jr. et al. |
| 2012/0026909 A1 | 2/2012 | Seok |
| 2012/0034874 A1 | 2/2012 | Yiu et al. |
| 2012/0120839 A1 | 5/2012 | Liu et al. |
| 2012/0140753 A1 | 6/2012 | Lee et al. |
| 2012/0218981 A1 | 8/2012 | Lee et al. |
| 2012/0294170 A1 | 11/2012 | Yu et al. |
| 2013/0107916 A1 | 5/2013 | Liu et al. |
| 2013/0188630 A1* | 7/2013 | Song ............... H04W 84/12 370/338 |
| 2013/0223427 A1 | 8/2013 | Sohn et al. |
| 2013/0294487 A1 | 11/2013 | Kim |
| 2014/0003384 A1 | 1/2014 | Zhang et al. |
| 2014/0098701 A1 | 4/2014 | Sohn et al. |
| 2014/0293916 A1 | 10/2014 | Sohn et al. |
| 2014/0334420 A1 | 11/2014 | You et al. |
| 2014/0348082 A1 | 11/2014 | Pare et al. |
| 2014/0348097 A1 | 11/2014 | Park et al. |
| 2015/0124900 A1* | 5/2015 | Shapira ............... H04B 7/0452 375/267 |
| 2015/0172026 A1* | 6/2015 | Zhang ............... H04L 5/0048 370/329 |

OTHER PUBLICATIONS

"Draft Standard for Information Technology—Telecommunications and information exchange between systems—Local and metropolitan area networks—Specific requirements: Part 11: Wireless LAN Medium Access Control (MAC) and Phyical Layer (PHY) specification," IEEE P802.11ac/D4.0, Oct. 2012, 408 pages.

European Search Report of the European Patent Office received in Patent Cooperation Treaty Application No. 13830917.4-1857/2898720; PCT/US2013/082251, dated Aug. 24, 2015, 7 pages.

"IEEE P802.11 Wireless LANS: Proposed Specification Framework for TGah," IEEE 802.11-12/1406r0, Nov. 15, 2012, 51 pages.

"IEEE Std 802.11, IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications," IEEE Computer Society, Mar. 29, 2012, 2,793 pages.

International Search Report and Written Opinion of the International Searching Authority received in Patent Cooperation Treaty Application No. PCT/CN2013/082251, dated Nov. 23, 2013, 11 pages.

Marcellin, M.W., "Trellis Coded Quantization of Memoryless and Gauss-Markov Sources," IEEE Transactions on Communications, Jan. 1990, pp. 82-93, vol. 38, Issue 1.

Perahia, E. et al., "Next Generation Wireless LANs Throughput, Robustness, and Reliability in 802.11n," Aug. 2008, 416 pages, Cambridge University Press, New York.

Salami, G. et al., "A Comparison Between the Centralized and Distributed Approaches for Spectrum Management," IEEE Communications Surveys & Tutorials, vol. 13, No. 2, Second Quarter, 2011, 18 pages.

Ungerboeck, G., "Channel Coding with Multilevel/Phase Signals," IEEE Transactions on Information Theory, Jan. 1982, pp. 55-67, Volumer 28, Issue 1.

* cited by examiner

SYSTEMS AND METHODS FOR INTERFERENCE ALIGNMENT IN WI-FI

CROSS-REFERENCE TO RELATED APPLICATIONS

The present application is a continuation of U.S. application Ser. No. 13/938,058, filed Jul. 9, 2013, titled "System and Method for Interference Alignment in Wi-Fi," which claims the benefit of U.S. Provisional Patent Application No. 61/693,103 filed Aug. 24, 2012 and entitled "System and Method for Interference Alignment in Wi-Fi," and U.S. Provisional Patent Application No. 61/718,031, filed Oct. 24, 2012 and entitled "System and Method for CSI-Based Interference Alignment with User Cooperation," which are incorporated herein as if produced in their entirety.

TECHNICAL FIELD

The present invention relates to a system and method for wireless communications, and, in particular embodiments, to a system and method for interference alignment in Wi-Fi.

BACKGROUND

In a wireless local area network (WLAN), each station (STA) can take a channel estimation formed between two access points (APs), and feed the information back to a controller AP, which may be a master AP, or one of the APs in collaboration. The controller AP then computes a beam-forming matrix based on the feedback. The beam-forming matrix is split into two, which is the same number as the number of APs for interference alignment (IA) to work, in the case of a two AP collaboration, but may be different with more than two APs.

There may be an Overlapped Basic Service Set (OBSS) issue where multiple APs are densely populated and there is only one large bandwidth available. That is, each AP may try to transmit the data to its own associated STA simultaneously under the same spectrum. While IA can be a solution for this issue, further development, such as IA channel estimation, is needed for IA to work in Wi-Fi.

SUMMARY OF THE INVENTION

In accordance with an embodiment, a method in a network component for interference alignment in a wireless local area network (LAN) with an overlapping basic service set (OBSS) includes instructing with the network component a first one of a plurality of access point (APs) in the wireless LAN to broadcast a null data packet (NDP) sounding packet to a plurality of stations when no other AP in the plurality of APs is broadcasting, wherein the NDP sounding packet comprises a plurality of long training field (LTFs), and wherein a total number of LTFs is equal to a total number of transmission streams, receiving a channel beamforming (BF) information and a signal plus interference to noise ratio (SINR) from each of the plurality of stations, wherein each of the plurality of stations computes the channel beamforming (BF) information and the SINR from sounding packets received from each of the plurality of APs in the wireless LAN, and determining a transmission schedule according to the SINRs and the pre-coder candidates.

In accordance with another embodiment, a network component configured for interference alignment in a wireless local area network (LAN) with an overlapping basic service set (OBSS) includes a processor; and a computer readable storage medium storing programming for execution by the processor, the programming including instructions to: instruct a first one of a plurality of access point (APs) in the wireless LAN to broadcast a null data packet (NDP) sounding packet to a plurality of stations when no other AP in the plurality of APs is broadcasting, wherein the NDP sounding packet comprises a plurality of long training field (LTFs), and wherein a total number of LTFs is equal to a total number of transmission streams; receive channel beamforming (BF) information and a signal plus interference to noise ratio (SINR) from each of the plurality of stations, wherein each of the plurality of stations computes the channel BF information and the SINR from sounding packets received from each of the plurality of APs in the wireless LAN; and determine a transmission schedule according to the SINRs and the channel BF information.

In accordance with another embodiment, a method in an access point (AP) for interference alignment in a wireless local area network (LAN) with an overlapping basic service set (OBSS) with multiple APs includes broadcasting with the AP a null data packet (NDP) sounding packet to a plurality of stations when no other AP in the wireless LAN is broadcasting, wherein the NDP sounding packet comprises a plurality of long training field (LTFs), and wherein a total number of LTFs is equal to a total number of transmission streams; receiving channel beamforming (BF) information and a signal plus interference to noise ratio (SINR) from each of the plurality of stations, wherein each of the plurality of stations computes the channel BF information and the SINR from sounding packets received from at least some of the plurality of APs in the wireless LAN; grouping stations with a same channel BF information in a group; selecting a station within each group that provides a best SINR; determining a sum-rate for each group according to a corresponding selected stations channel BF information and its corresponding SINR; determining a group that provides a best sum-rate; and creating a beamforming matrix according to the determined channel BF information from the determined group, wherein a first column corresponds to a beamforming vector for a first one of the multiple APs.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

An embodiment implements an interference alignment (IA) algorithm in a Wi-Fi system, and in particular may be implemented where an OBSS situation is formed. An embodiment includes a preamble design to enable an IA algorithm to work in a Wi-Fi system. Although primarily described with reference to two AP collaboration, the disclosed embodiments are not limited to two AP collaboration, but may be extended to cases of more than two APs in collaboration.

When an IA mode is triggered, an AP broadcasts a null data packet (NDP) sounding packet for channel feedback alternately among the APs in the OBSS network. The preamble design may be conformed to the existing specification, but the number of long training fields (LTFs) should be equal to the number of transmit (TX) streams (TX N_STS), which is different from the existing NDP sounding packet format. The effective channel estimation is done in each STA, and is used for the computation of post-detection signal plus interference to noise ratio (SINR) per TX space-time stream.

The sum-rate using the SINRs and pre-coder candidates are computed over all sub-carriers, and the pre-coder that is giving the best sum-rate is selected, in the case of channel quality indicator (CQI)-based beamforming feedback (pre-coding matrix indicator (PMI) and SINR feedback). The selected pre-coder and its corresponding SINRs are fed back from each STA. The AP (both APs may receive the feedback information and pass it over to the controller AP (master AP) or a backhaul controller receives the feedback information from all STAs, and makes a grouping of stations based on the fed back preferred pre-coder index, that is, those with the same preferred pre-coder are grouped together.

Among each group, the fed back SINR per TX stream is compared, and the STA that gives the best SINR is selected. The sum-rate is computed again in each group based on the selected STA and its corresponding SINR. The sum-rate among all the groups is computed, and the group that gives the best sum-rate is chosen. The corresponding pre-coder to the selected group is the pre-coder selected and the already selected STAs in that group are scheduled from both APs. The left half columns are used for the beamforming matrix for on AP (AP0) and the right half columns are the beamforming matrix for the other AP (AP1).

While an embodiment IA system is described with CQI-based beamforming feedback, embodiments are not limited to a CQI based feedback system, but may be generalized to channel state information (CSI)-based beamforming feedback systems where the V matrix out of singular value decomposition (SVD) of estimated effective channels are angle-quantized and fed back together with the SINR values.

The selected STAs receive the data packet transmission (also referred to as a data transmission packet), take a minimum mean square error (MMSE) MIMO detection, and calculate the rank 2*(N_STS) MIMO transmissions; that is, the N_STS MIMO transmission from each AP will make the 2*(N_STS) overall MIMO transmission in the 2 APs IA situation. The soft-output from MMSE MIMO detection is passed over to the Viterbi decoder, and the corresponding elements to each STA among the decoded signals are taken. The computation in each STA during the NDP sounding, the operation in each AP for the user scheduling, and the channel estimation and detection computation in each AP are described below.

In an embodiment, multiple APs are made possible to transmit data concurrently with the help of BF technology.

In an embodiment, an LTF set is disclosed for a preamble frame. The number of LTFs depends on the number of TX streams (N_STS) per AP for the channel sounding packet, and for the data packet, the number of LTFs are N_STS times the number of APs in collaboration.

In an embodiment, the TX stream and TX antenna configuration is set in accordance with the number of APs in collaboration. For example, in case 4 APs and 2 TX streams per AP will be in the AP collaboration mode, there will be at least 8×8 overall MIMO antenna configuration from the STA side, which results in the 8×2 BF precoder per AP. Hence, in this case, there should be 8 TX antennas per AP.

In an embodiment, if the number of LTFs is the number of TX streams (N_STS) per AP for the sounding packet, only one AP may be operational while the others in the network with the same spectrum are shut off during the NDP sounding packet transmission for a beam-forming feedback.

Figure 1:
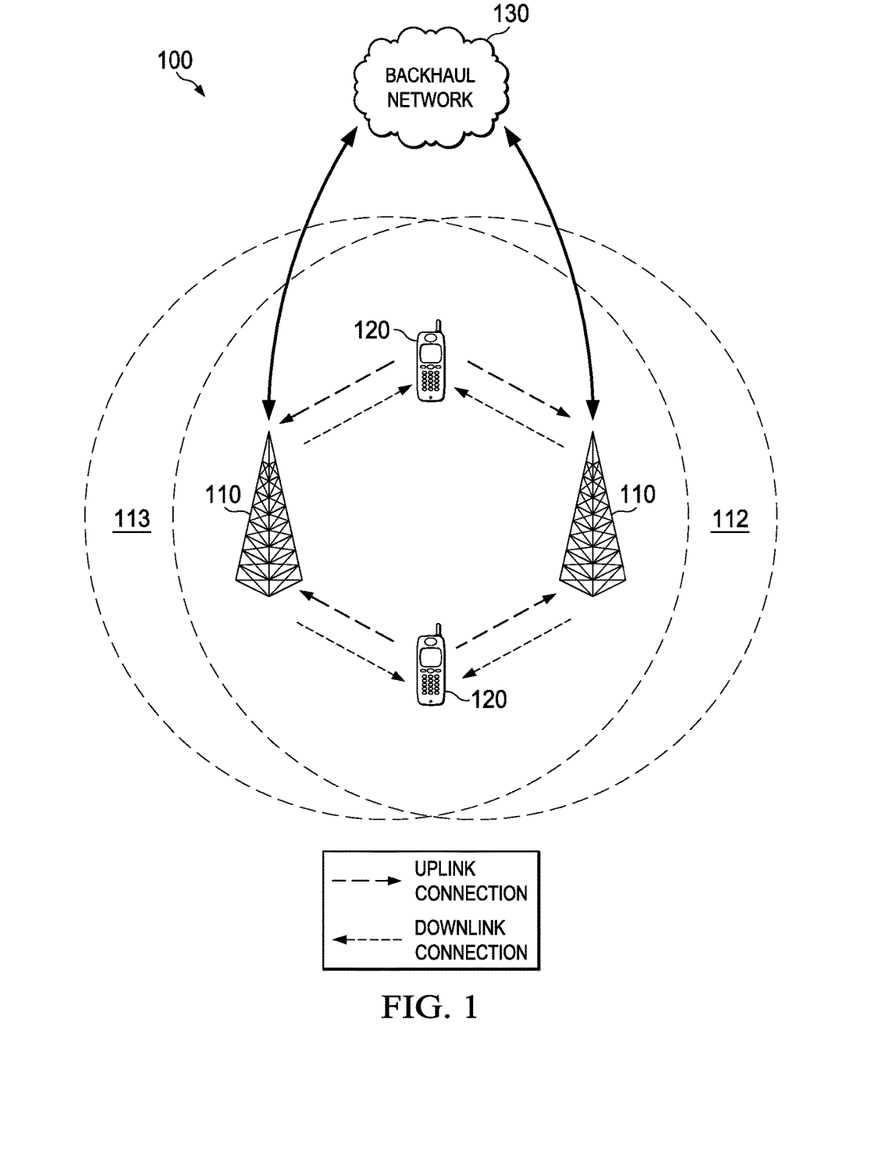
FIG. 1 illustrates a network for communicating data.

FIG. 1 illustrates a network 100 for communicating data. The network 100 comprises a multiple access points (APs) 110 that have overlapping coverage areas 112, 113, a plurality of user equipment (UEs) 120, and a backhaul network 130. As used herein, the term AP may also be referred to as a transmission point (TP) and the two terms may be used interchangeably throughout this disclosure. Also, as used herein, the term UE may also be referred to as STA and the two terms may be used interchangeably throughout this disclosure. The AP 110 may comprise any component capable of providing wireless access by, inter alia, establishing uplink (dashed line) and/or downlink (dotted line) connections with the UEs 120, such as a base transceiver station (BTS), an enhanced base station (eNB), a femtocell, and other wirelessly enabled devices. The UEs 120 may comprise any component capable of establishing a wireless connection with the AP 110. The backhaul network 130 may be any component or collection of components that allow data to be exchanged between the APs 110 and a remote end (not shown). In some embodiments, the network 100 may comprise various other wireless devices, such as relays, femtocells, etc.

Because multiple APs 110 are operating in an area with overlapping coverage areas 112, 113, interference between transmissions from the APs 110 and the UEs 120 may pose problems for effective communication. The APs 110 may be configured to utilize embodiment IA algorithms as described below in order to improve the communications between the various devices in the network 100.

Figure 2:
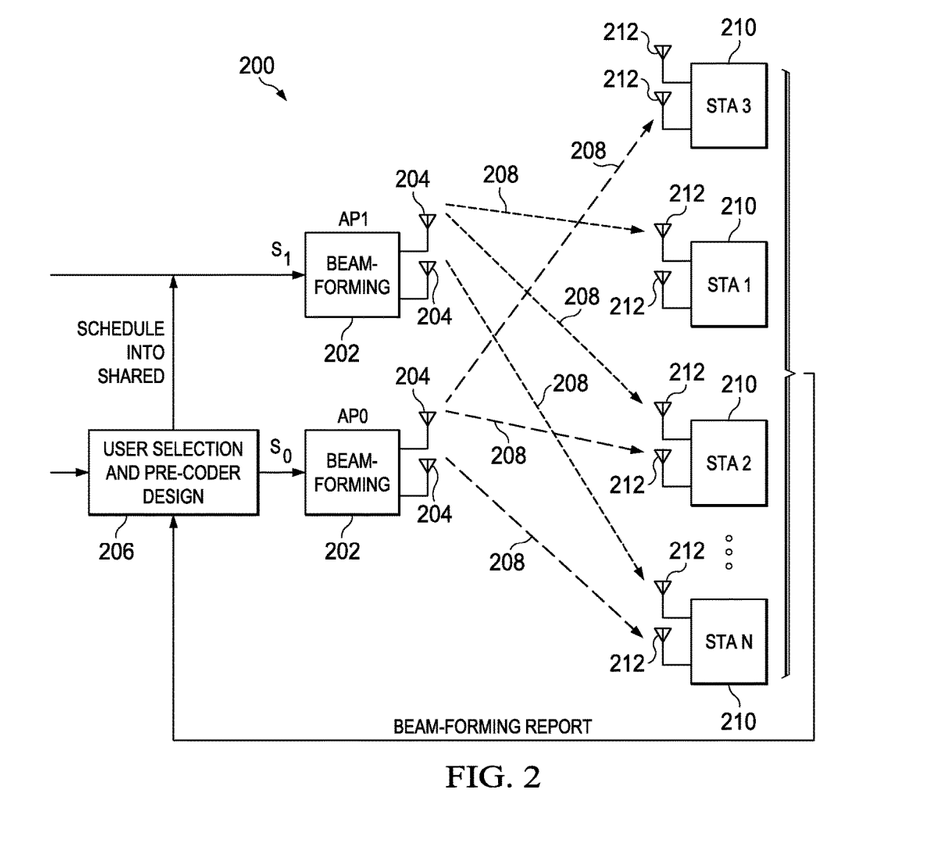
FIG. 2 illustrates an embodiment of overall IA operation applied in a Wi-Fi system, with an LTF design for channel estimation in IA operation mode.

FIG. 2 illustrates an embodiment system 200 of overall IA operation applied in a Wi-Fi system, with an LTF design for channel estimation in IA operation mode. In an embodiment, system 200 utilizes channel state information (CSI) feedback in performing IA. In another embodiment, system 200 utilizes channel quality information (CQI) feedback in performing IA. System 200 includes multiple APs 202 (labeled AP0 and AP1) and multiple stations (STAs) 210 (labeled STA 1, STA 2, STA 3, and STA N). The system 200 also includes a user selection and pre-coder design unit 206. Each AP 202 includes multiple transmitter antennas 204 and each STA 210 includes multiple receiver antennas 212. The APs 202 transmits an NDP sounding packet in transmission streams 208; the LTF design for beam-forming sounding is described hereinafter.

As we see from FIG. 2, in a CSI feedback embodiment, two APs 202 transmit the Down Link (DL) signals concurrently, and the beamforming at each AP 202 needs to be designed in consideration of interferences from the other AP 202. Disclosed is an LTF design that enables this AP collaboration in a Wi-Fi system using CSI feedback from the STAs 210. The following description explains an embodiment based on two AP 202 collaboration. However, other embodiments are not limited to the two APs case, but may be extended to more than two APs case. In an embodiment, the beamforming design is implemented in Channel-Nulling or Eigen Beam-forming (EGB) method using the angle quantization based beamforming (BF) feedback according to Institute of Electrical and Electronics Engineers (IEEE) 802.11ac or the precoder matrix indicator (PMI) based BF feedback like the Long Term Evolution (LTE) system. However, the BF feedback scheme is not limited to the IEEE 802.11ac type of feedback or the LTE-like feedback.

Each AP 202 in the collaboration mode will broadcast the NDP sounding packet one by one, and all the STAs 210 within the network 200 will take a channel estimation using the sounding packet. Each AP 202 takes the SVD operation, and computes the V matrix for the Eigen vectors and the S vector for the singular values. The angle quantized V matrix as well as the singular values are feedback to its associated AP 202, where two APs 202 will share the feedback information. The singular values from the S vector will be used for the SINR and sum-rate computation. In case there is a single TX stream per AP 202, one dominant singular value will be used for the SINR and sum-rate computation, and when there are multiple TX streams per each AP 202, the same number of singular values as the number of TX streams will be used for the SINR and sum-rate computation. The sum-rate may be computed at each STA 210 and feedback to AP 202, or just like the current IEEE 802.11ac, the S vector will be feedback and the sum-rate can be computed at each AP 202. Either way is possible.

Each element in the singular vector S represents the Eigen values of channel matrix formed between 2 APs 202 and each STA 210. Each STA 210 takes the dominant Eigen value(s) out of the S vector. The average sum-rate per STA 210 is computed as follows, $$C_{avg\_sum} = \frac{1}{N}\sum_{1}^{N}\sum_{i=1}^{Nsts}\log(1+s_i),$$

where $C_{avg\_sum}$ is the average sum-rate per STA 210, N is the number of subcarriers per symbol, N_STS is the number of TX streams per AP 202, and $S_i$ represents the $i^{th}$ dominant singular value of the singular vector S.

The master AP 202 will choose two STAs 210 with the best two sum-rates in case one STA 210 per AP is supposed to be selected. With the V matrix of those selected two STAs 210, each AP 202 (or master AP 202) takes the first N_STS columns of those two selected V matrix, and assigns those two sets of N_STS columns to each AP 202 for the beam-forming matrix. This type of BF design is called an EGB. The size of the beamforming matrix per AP 202 is $N_{TX}$ X N_STS, where $N_{TX}$ is the number of TX antennas.

If it is desired to design the BF matrix in a Channel-Nulling method for the aforementioned case above, then, first of all, try to find the null-space for the first N_STS columns of each selected V matrix. Each found null-space will be applied for the BF of other AP 202, that is, when $V_0$ is called an EGB matrix of AP0 202, and $V_1$ is called an EGB matrix of AP1 202, the null-space of $V_0$ will become a BF matrix for AP1 202, and the null-space of $V_1$ will become a BF matrix for AP0 202.

Once the user selection and BF matrix design are done, the data packet will be transmitted to those selected STAs 210. The selected STAs may take an MMSE MIMO detection after receiving the data packet, thinking the rank 2*(N_STS) MIMO transmissions, that is, the N_STS MIMO transmission from each AP 202 will make the 2*(N_STS) overall MIMO transmission in 2 APs 202 collaboration situation.

Next, an Interference Alignment system in Wi-Fi using a PMI type of BF feedback (i.e., a CQI feedback embodiment) is described. A pre-set of PMI can be assumed. The channels are estimated for the sounding packets broadcasted by each AP 202 respectively one by one, and each individual pre-coder in the pre-set PMI of each STA 210 will be applied to get the effective channels, which is used for the computation of SINRs per each TX stream. We may get the sum-rate with the TX SINRs for the effective channels, and find out the PMI index which generates the best sum-rate. The chosen PMI index and its corresponding TX SINRs will be fed back to each AP 202 as a BF report by each STA 210. The master AP 202 groups all the STAs 210 with the same fed back PMI index. The TX SINRs per TX stream will be compared among the grouped STAs 210, and the best SINR will be chosen for the TX stream. The new sum-rate based on the chosen best SINRs among the grouped STAs 210 will be computed, and these new sum-rates computed over all the groups will be compared among each other and choose one precoder producing the best sum-rate.

Once the precoder is obtained from the aforementioned procedure above, the first half columns of the precoder will be used for the BF matrix of AP0 202, and the right half columns for the BF matrix of AP1 202. The detection scheme may be the same for both PMI based BF or EGB (or Channel-Nulling) based BF.

Figure 3A:
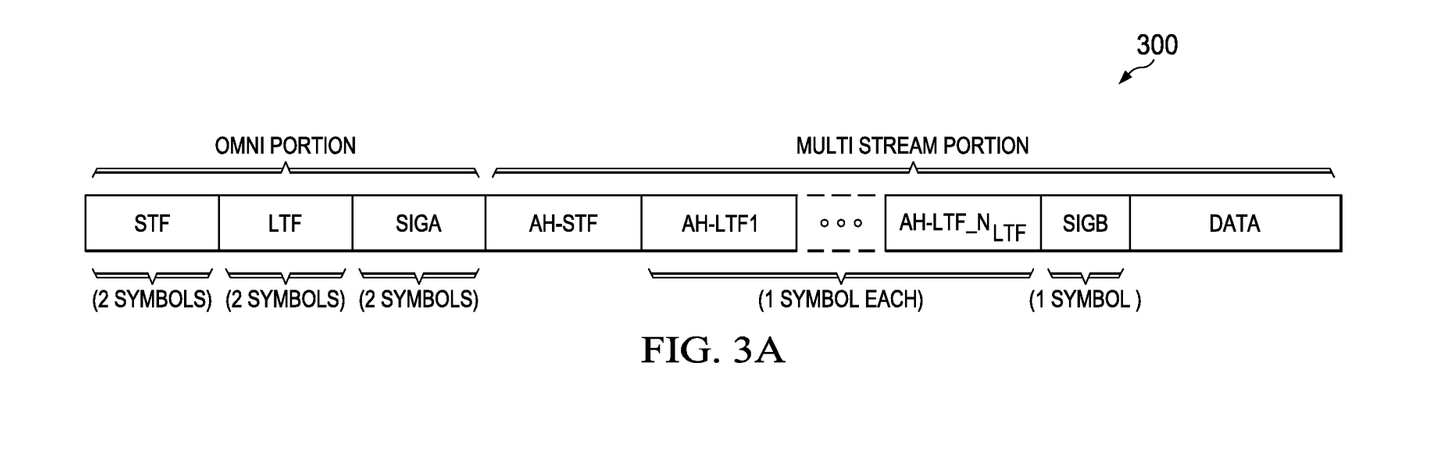
FIG. 3A illustrates an embodiment of a preamble for NDP sounding and data packet frame.
Figure 3B:
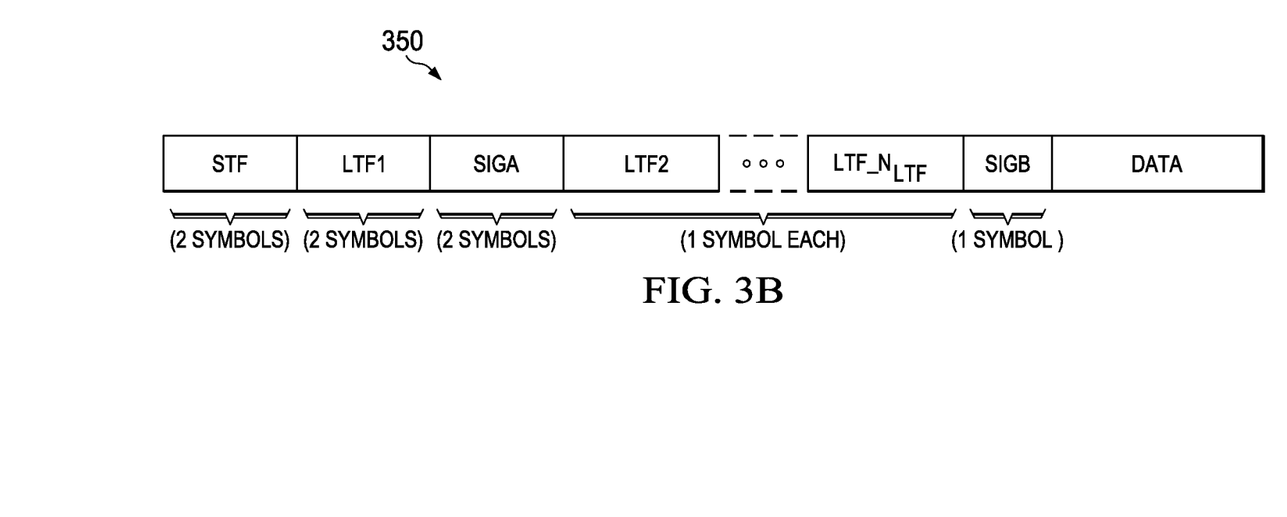
FIG. 3B illustrates an embodiment of a preamble for an NDP sounding and data packet frame.

Disclosed herein is a new Preamble design to accommodate the proposed AP collaborated communications. The preamble for the channel sounding period will be different from the data packet. The number of Long Training Field (LTF) is dependent on the number of TX streams (Rank of TX Transmissions) per AP, which is different from the existing standards where the channel sounding packet has as many LTFs as the number of TX antennas, but, here, we will take an antenna virtualization among multiple APs. That is, each STA will take channel estimation for the TX streams not for the actual TX antennas. We may describe it using the Short packet frame or Long packet frame of IEEE 802.11ah. FIGS. 3A and 3B show the Short preamble and the Long preamble frame format of IEEE 802.11ah.

FIGS. 3A and 3B illustrate an embodiment of a preamble for IA beamforming feedback. Any preamble packet format in IEEE 802.11 such as IEEE 802.11n Mixed-mode or Green field packet, IEEE 802.11ac packet, or short or long packet in IEEE 802.11ah may be used. Unlike legacy WiFi, the number of LTFs for channel estimation is identical to the number of streams, i.e., the TX rank. Cyclic delay diversity (CDD) is used; no beam-forming is applied. When one AP broadcasts the beam-forming packet, the other AP is supposed to be shut-off. The N_STS should be one half of N_TX, for example, when N_STS is 2, the N_TX is 4 in the case of a two AP collaboration situation.

FIGS. 3A and 3B illustrate an embodiment of a preamble for a data packet frame. Any preamble packet format in IEEE 802.11 such as IEEE 802.11n Mixed-mode or Green field packet, IEEE 802.11ac packet, or short or long packet in IEEE 802.11ah may be used. Unlike legacy WiFi, the number of LTFs for channel estimation is identical to the number of TX antennas. The available two APs transmit the beam-formed data packet to destination STAs simultaneously. The number of streams (N_STS) should be one half of N_TX, for example, when N_STS is 2, the N_TX is 4, or when N_STS is 1, the N_TX is 2 (in the case of a two AP collaboration situation), etc.

The Cyclic Delay Diversity (CDD) will be only applied per antenna in the sounding packet without the beamforming applied. The number of TX streams (N_STS) should be one half of $N_{TX}$, that is, when N_STS is 2, the $N_{TX}$ should be 4, as in the case of 2 AP collaboration.

As for the data packet, it is vice versa. The number of LTFs depends on the number of TX antennas ($N_{TX}$) per AP, or we may say the number of LTFs is twice as many as N_STS per antenna when there is a 2 AP collaboration. The APs in collaboration mode will transmit the data packets concurrently. The number of TX streams (N_STS) should be one half of $N_{TX}$ for the beamforming in case of 2 AP collaboration. The same frame format in FIGS. 3A and 3B may be applied to the data packets.

Returning to FIG. 2, in an embodiment, two APs 202 may operate in the same frequency band in a Wi-Fi network. Multiple STAs 210 may be served simultaneously from the two APs 202, which increases the overall data throughput. In an embodiment, the existing preamble design is modified to enable IA operation. In an embodiment, the same number of LTFs to the number of TX streams 208 per AP 202 is transmitted for NDP sounding, that is, for beam-forming channel feedback. In an embodiment, the same number of LTFs to the number of TX antennas 204 per each AP 202 is transmitted for a data packet transmission. In an embodiment, the IA operation may be available only for the AP 202 whose number of TX streams 208 is one half the number of TX antennas 204 in the case of a two AP collaboration situation. In an embodiment, during the NDP sounding packet transmission for a beam-forming feedback, only one AP 202 may be operational while the others in the network with the same spectrum are shut off.

In an embodiment, the STAs 210 perform effective channel estimation, which is used for computing SINR per each stream 208 in each AP 202. The STAs 210 compute the sum-rate using these SINRs per Space-Time-Stream (STS) 208 in each AP 202 over all subcarriers, and choose the pre-coder that best matches. The STAs 210 feedback the preferred pre-coder and its corresponding SINRs to the AP 202 (master AP). In an embodiment, the master AP 202 is AP0 202. The master AP includes the user and pre-coder selection unit 206. In other embodiments, the user and pre-coder selection unit 206 may be included in a server reached through a backhaul network.

The AP 202 selects the STAs 210 to schedule and the corresponding pre-coder. The AP 202 transmits a data packet; the preamble design for the data packet is described hereinafter. In an embodiment, the left half columns of the selected pre-coder are used for the beam-forming of AP0 202 and the right half columns of the selected pre-coder are used for the beam-forming of AP1 202.

The selected STAs 210 take an MMSE MIMO detection, and calculate the rank 2*(N_STS) MIMO transmissions; that is, the N_STS MIMO transmission from each AP 202 will make the 2*(N_STS) overall MIMO transmission in the 2 APs IA situation. The soft-output from MMSE MIMO detection is passed over to the Viterbi decoder.

In existing Wi-Fi systems, carrier sense multiple access with collision avoidance (CSMA/CA) is the multiple access scheme, where only one AP provides a service to a STA in the OBSS case. An embodiment enables an IA scheme in which two APs in the same spectrum can transmit the data to multiple STAs simultaneously. An embodiment changes the preamble packet, and has a restriction between the number of TX steams and the number of TX antennas.

An embodiment resolves an OBSS situation in large bandwidth Wi-Fi operation without sacrificing throughput. Embodiments may be implemented in next generation Wi-Fi access points and cellular systems, such as next-generation Wi-Fi enterprise access points, 3GPP LTE and/or advanced base stations, and the like.

Figure 4:
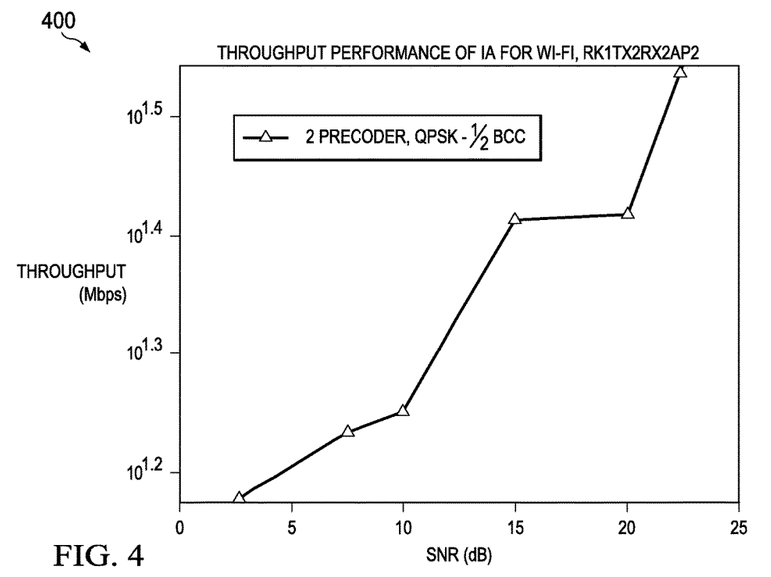
FIGS. 4 and 5 illustrate throughput and bit error rate (BER) performance results, respectively, based on the simulation environments.
Figure 5:
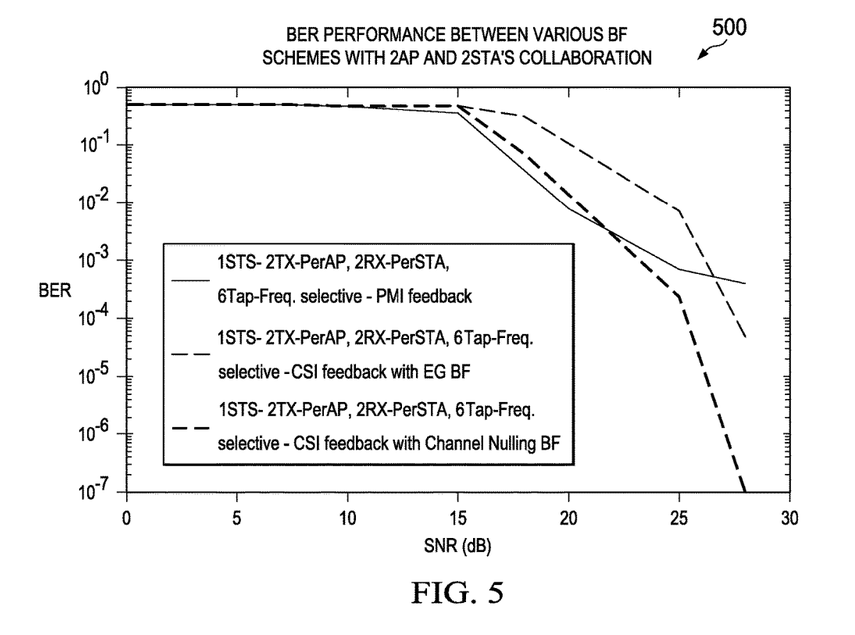

A simulation environment, which is one example embodiment, includes 2 APs, 1 TX stream-2 TX antennas per AP; 10 STAs, 2 RX per STA; flat fading channel between each TX-RX pair; a codebook size of two pre-coders (two 2×2 pre-coders); QPSK and rate ½ BCC with a Viterbi Decoder; and one iteration for beam-forming vector selection. FIGS. 4 and 5 illustrate throughput performance results 400 and bit error rate (BER) performance results 500, respectively, based on the simulation environments.

Figure 6:
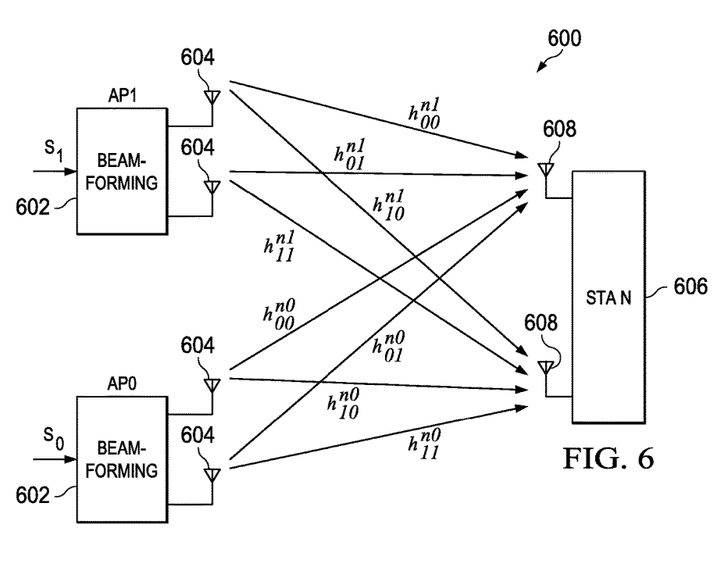
FIG. 6 illustrates an embodiment system of each STA's operation during NDP sounding.

FIG. 6 illustrates an embodiment system 600 of each STA's operation during NDP sounding. The illustration in FIG. 6 is based on the simulation environment above. System 600 includes multiple APs 602 (labeled AP0 and AP1) and the $n^{th}$ STA 606. Each AP 602 includes two transmitter antennas 604 and transmits sounding packet streams 610. Each STA 606 includes two receiver antennas 608.

$$r_0 = s_1 h_{00}^{n1} + s_1 e^{j\theta} h_{01}^{n1} + N$$

$$r_1 = s_1 h_{10}^{n1} + s_1 e^{j\theta} h_{11}^{n1} + N$$

where $r_i$ is the received signal at the $i^{th}$ receiver, h is the channel parameter, and θ is the CDD value which is a function of the subcarrier index.

$$r_0 = s_1 h_{00}^{n1} + s_1 e^{j\theta} h_{01}^{n1} + N = s_1(h_{00}^{n1} + e^{j\theta} h_{01}^{n1}) + N = s_1 h_{eff0}^{n1} + N$$

$$r_1 = s_1 h_{10}^{n1} + s_1 e^{j\theta} h_{11}^{n1} + N = s_1(h_{10}^{n1} + e^{j\theta} h_{11}^{n1}) + N = s_1 h_{eff1}^{n1} + N$$

where $h_{eff0}^{n1}$ and $h_{eff1}^{n1}$ are estimated with one LTF from AP1.

The N above represents the Additive White Gaussian Noise (AWGN). Here, $s_1$ is the LTF sequence in that subcarrier. In the same way, $h_{eff0}^{n0}$ and $h_{eff1}^{n0}$ are estimated between STA n and AP0. After the NDP sounding period, the STA n will estimate the channel, $H_l^r =$ $$\begin{bmatrix} h_{eff0}^{n0} & h_{eff0}^{n1} \\ h_{eff1}^{n0} & h_{eff1}^{n1} \end{bmatrix}.$$

The SINR for the EGB or Channel Nulling type of BF is computed using the singular values after the SVD operation of the $H_n$. The SINR for the PMI type of BF is computed with the following equation. First, multiple $H_n$ with each precoder candidate, such that $$H_l^r = \begin{bmatrix} h_{eff0}^{n0} & h_{eff0}^{n1} \\ h_{eff1}^{n0} & h_{eff1}^{n1} \end{bmatrix} V_l,$$

where $V_l$ is the $l^{th}$ pre-coder and $H_l^r$ is the effective channel matrix. The SINR for the TX stream is computed as $\text{SINR}_{l,j}^r = h_{l,i}^{r}{}^H (h_{l,j}^r h_{l,j}^{r}{}^H + \sigma^2 I) h_{l,i}^r$, where $i,j=0, 1$; $i \neq j$; $l=0, \ldots, L-1$. Then, the sum-rate is computed with the following equation: $R_l = \sum_i \log(1 + \Gamma_i)$, where $R_l$ is the corresponding sum-rate for the $l^{th}$ pre-coder, and $\Gamma_i$ is the SINR per $i^{th}$ TX-stream, that is, $i^{th}$ AP 602 for the case of 2 AP and a single TX stream per AP. Each AP 602 feeds back the preferred $l^{th}$ pre-coder and the TX SINR for the AP 602 to compute the sum-rate.

In an embodiment, each AP 602 operates to select pre-coders and users. First, the STAs 606 are grouped according to the fed back preferred pre-coder, that is, those STAs 606 with the same preferred pre-coder are grouped together. Among each group, the fed back SINR per TX stream 610 is compared, that is, per AP 602, and the STA 606 that gives the best SINR is chosen. The sum-rate is computed again in each group based on the selected STA 606 and its corresponding SINR. The sum-rate between all the groups is compared, and the group that gives the best sum-rate is chosen. The corresponding pre-coder to the selected group is the pre-coder selected and the already selected two STAs 606 in that group are scheduled per each AP 602. The selected pre-coder is the 2×2 matrix in this case, and the first column is used for the beamforming vector for the AP0 602 and the second column is the beamforming vector for the AP1 602.

Figure 7:
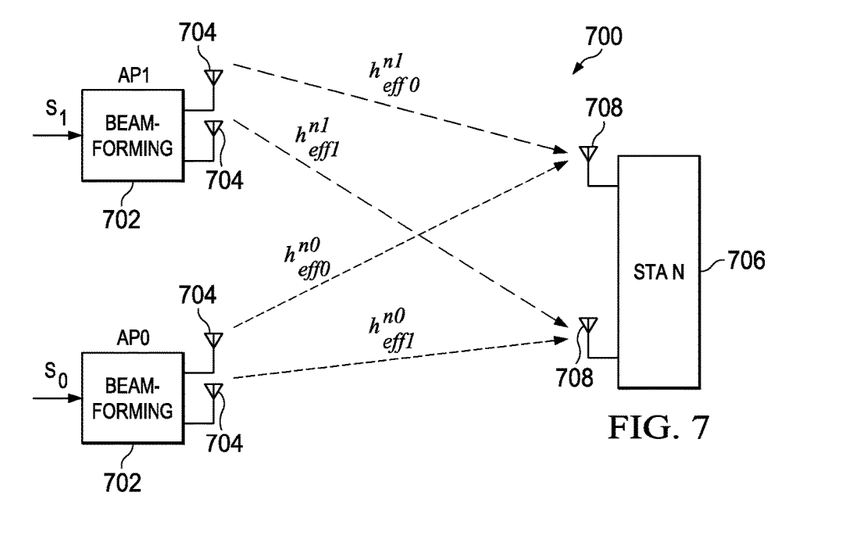
FIG. 7 illustrates an embodiment system of each STA's operation during data packet transmission using a CSI based BF feedback.

FIG. 7 illustrates an embodiment system 700 of each STA's operation during data packet transmission using a CSI based BF feedback. The system 700 includes two APs 702 (labeled AP0 and AP1) and multiple STAs 706. Each AP 702 includes two transmitter antennas 704 and each STA 706 includes two receiver antennas 708. System 700 illustrates the detail operation at each STA 706 during the Data transmission period with two APs 702. Each STA 706 estimates the channel for each TX stream, and it is $$H_{eff}^n = \begin{bmatrix} h_{eff0}^{n0} & h_{eff0}^{n1} \\ h_{eff1}^{n0} & h_{eff1}^{n1} \end{bmatrix}.$$

Each element of it is $$\hat{h}_{eff0}^{n0} = \frac{r_0^{t0} - r_0^{t1}}{2 \cdot l_k}, \hat{h}_{eff0}^{n1} = \frac{r_0^{t0} - r_0^{t1}}{2 \cdot l_k},$$

$$\hat{h}_{eff1}^{n0} = \frac{r_1^{t0} - r_1^{t1}}{2 \cdot l_k}, \hat{h}_{eff1}^{n1} = \frac{r_0^{t0} - r_0^{t1}}{2 \cdot l_k},$$

where $r_i$ is the received signal at the $i^{th}$ receiver, tn is the nth symbol transmission time, and k is the subcarrier index. If the received signal is denoted as $$\bar{r} = \begin{bmatrix} r_0 \\ r_1 \end{bmatrix},$$

and the transmitted signal $$\bar{d} = \begin{bmatrix} d_0 \\ d_1 \end{bmatrix},$$

where $d_0$ and $d_1$ are the desired signals for the STA 706 scheduled from AP0 702 and AP1 702, respectively, then, the MMSE-MIMO detection produces the detected $\bar{d}$ as follows:

$$[H_{eff}^H H_{eff} + N_0 I]^{-1} H_{eff}^H \bar{r} = [H_{eff}^H H_{eff} + N_0 I]^{-1} H_{eff}^H H_{eff} \bar{d} + N$$

Figure 8:
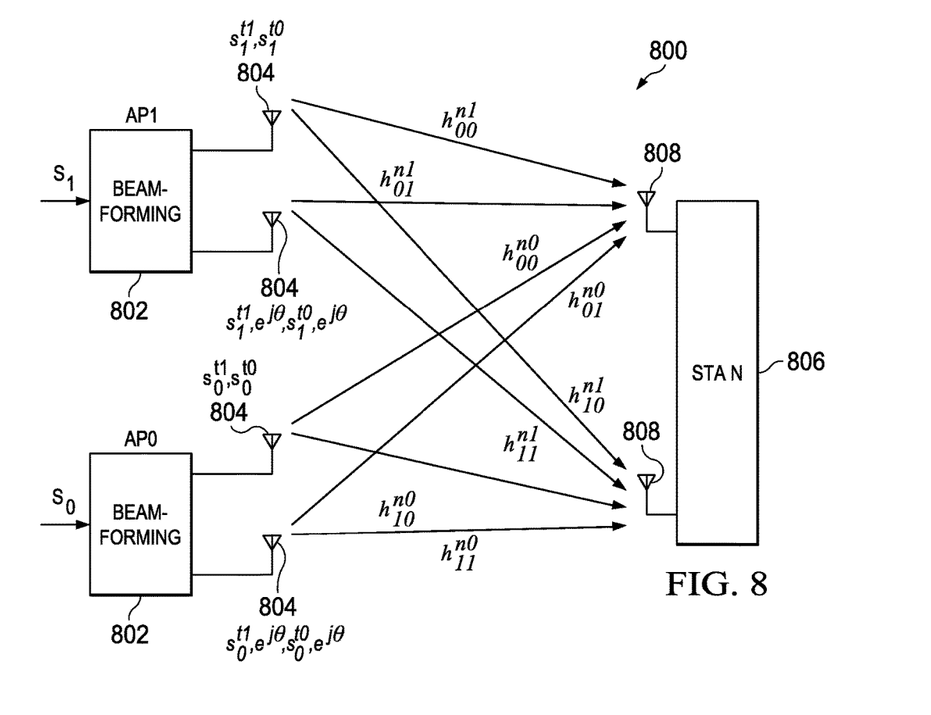
FIG. 8 illustrates an embodiment system of each STA's operation during data packet transmission using CQI based BF feedback information.

FIG. 8 illustrates an embodiment system 800 of each STA's operation during data packet transmission using CQI based BF feedback information. The system 800 includes two APs 802 (labeled AP0 and AP1) and multiple STAs 806. Each AP 802 includes two transmitter antennas 804 and each STA 806 includes two receiver antennas 808. Two LTFs are transmitted from each AP 802, that is, LTF0 and LTF1. The LTF sequence at the same subcarrier position in each LTF0 and LTF1 are called $s_i^{t0}$ and $s_i^{t1}$.

$$r_0^{t0} = s_0^{t0} h_{00}^{n0} + s_1^{t0} h_{00}^{n1} + s_0^{t0} e^{j\theta} h_{01}^{n0} + s_1^{t0} e^{j\theta} h_{01}^{n1} + N$$

$$r_1^{t0} = s_0^{t0} h_{10}^{n0} + s_1^{t0} h_{10}^{n1} + s_0^{t0} e^{j\theta} h_{11}^{n0} + s_1^{t0} e^{j\theta} h_{11}^{n1} + N$$

$$r_0^{t1} = -s_0^{t1} h_{00}^{n0} - s_1^{t1} h_{00}^{n1} + s_0^{t1} e^{j\theta} h_{01}^{n0} + s_1^{t1} e^{j\theta} h_{01}^{n1} + N$$

$$r_1^{t1} = -s_0^{t1} h_{10}^{n0} - s_1^{t1} h_{10}^{n1} + s_0^{t1} e^{j\theta} h_{11}^{n0} + s_1^{t1} e^{j\theta} h_{11}^{n1} + N$$

where $r_i^{tj}$ is the received signal at the $i^{th}$ receiver and at time tj.

$$r_0^{t0} = s_0^{t0}(h_{00}^{n0} + e^{j\theta} h_{01}^{n0}) + s_1^{t0}(h_{00}^{n1} + e^{j\theta} h_{01}^{n1}) + N$$

$$r_1^{t0} = s_0^{t0}(h_{10}^{n0} + e^{j\theta} h_{01}^{n0}) + s_1^{t0}(h_{00}^{n1} + e^{j\theta} h_{01}^{n1}) + N$$

$$\begin{bmatrix} r_0^{t0} \\ r_1^{t0} \end{bmatrix} = \begin{bmatrix} h_{eff0}^{n0} & h_{eff0}^{n1} \\ h_{eff1}^{n0} & h_{eff1}^{n1} \end{bmatrix} \begin{bmatrix} s_0^{t0} \\ s_1^{t0} \end{bmatrix}$$

$r_0^{t1}$ and $r_1^{t1}$ can be obtained in a similar manner.

For the LTF sequence, $s_0^{t0} = s_1^{t0} = s_0^{t1} = s_1^{t1}$ and the estimated effective channel parameters are:

$$\hat{h}_{eff0}^{n0} = \frac{r_0^{t0} - r_0^{t1}}{2 \cdot s_i^{tj}}, \hat{h}_{eff0}^{n1} = \frac{r_0^{t0} - r_0^{t1}}{2 \cdot s_i^{tj}},$$

$$\hat{h}_{eff1}^{n0} = \frac{r_1^{t0} - r_1^{t1}}{2 \cdot s_i^{tj}}, \hat{h}_{eff1}^{n1} = \frac{r_1^{t0} - r_1^{t1}}{2 \cdot s_i^{tj}},$$

When $$\bar{r} = \begin{bmatrix} r_0 \\ r_1 \end{bmatrix}, H_{eff} = \begin{bmatrix} h_{eff0}^{n0} & h_{eff0}^{n1} \\ h_{eff1}^{n0} & h_{eff1}^{n1} \end{bmatrix}$$

and transmitted data are $$\bar{d} = \begin{bmatrix} d_0 \\ d_1 \end{bmatrix},$$

MMSE MIMO detection may provide detected $\bar{d}$ as follows, $$[H_{\mathit{eff}}{}^H H_{\mathit{eff}} + N_0 I]^{-1} H_{\mathit{eff}}{}^H \overline{r} = [H_{\mathit{eff}}{}^H H_{\mathit{eff}} + N_0 I]^{-1} H_{\mathit{eff}}{}^H H_{\mathit{eff}}$$
$$\overline{d} + N$$

where $d_0$ is the desired signal for the STA 806 scheduled from AP0, and $d_1$ is the desired signal for the STA 806 scheduled from AP1 802.

Figure 9:
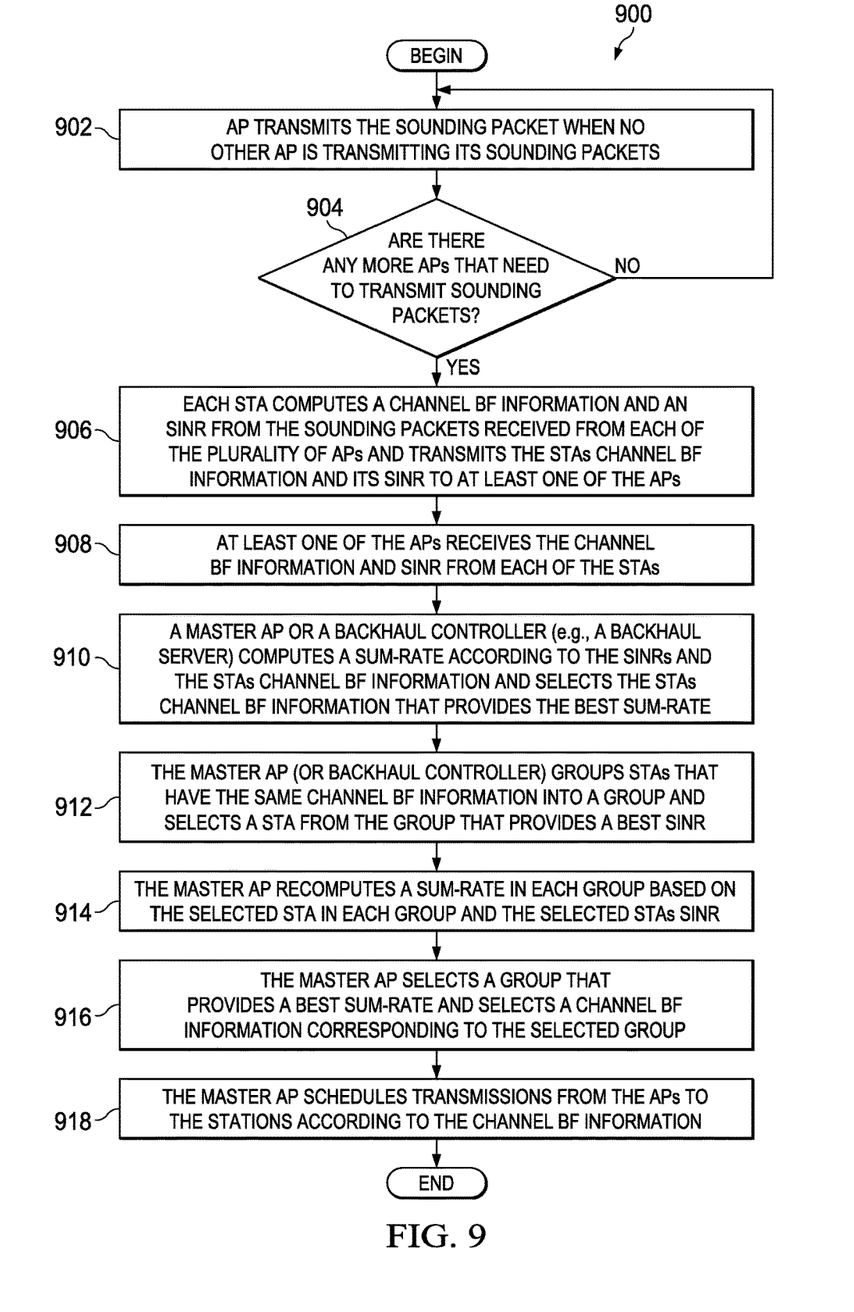
FIG. 9 illustrates a flowchart of an embodiment method for NDP sounding in a Wi-Fi network.

FIG. 9 illustrates a flowchart of an embodiment method 900 for NDP sounding in a Wi-Fi network. The method 900 begins at block 902 where a first one of a plurality of APs transmits a sounding packet with each of a plurality of transmission antennas to a plurality of stations that each have two or more receiver antennas. In an embodiment, the sounding packet is a null data sounding packet that includes a plurality of LTFs where the total number of LTFs is equal to the total number of transmission streams. The first AP transmits the sounding packet when no other AP is transmitting its sounding packets. Next, the method 900 proceeds to block 904 where it is determined whether there are any more APs that need to transmit sounding packets. If there are additional APs, then the method 900 proceeds to block 902. If all of the APs have transmitted sounding packets, then the method 900 proceeds to block 906. At block 906, each STA computes a pre-coder and an SINR from the sounding packets received from each of the plurality of APs and transmits the STA's channel beamforming information and its SINR to at least one of the APs. At block 908, at least one of the APs receives the channel beamforming information and SINR from each of the STAs. At block 910, a master AP or a backhaul controller (e.g., a backhaul server) computes a sum-rate based on the SINRs and the pre-coder candidates and selects the pre-coder that produces the best sum-rate. At block 912, the master AP (or backhaul controller) groups STAs that have the same channel beamforming information (e.g., a preferred pre-coder) into a group and selects a STA from the group that provides the best SINR. At block 914, the master AP recomputes a sum-rate in each group based on the selected STA in each group and the selected STAs SINR. At block 916, the master AP selects a group that provides the best sum-rate and selects the channel beamforming information (e.g., a pre-coder) corresponding to the selected group. At block 918, the master AP schedules transmissions from the APs to the selected STAs through the chosen channel beamforming information (e.g., pre-coder), after which, the method 900 ends.

Figure 10:
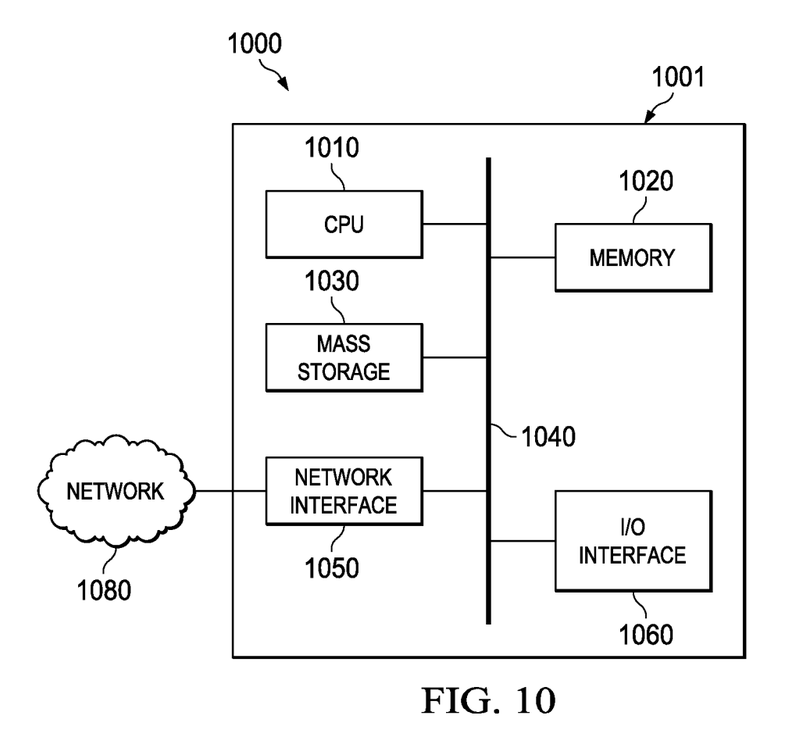
FIG. 10 is a processing system that can be used to implement various embodiments.

FIG. 10 is a block diagram of a processing system 1000 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1000 may comprise a processing unit 1001 equipped with one or more input/output devices, such as a speaker, microphone, mouse, touchscreen, keypad, keyboard, printer, display, and the like. The processing unit 1001 may include a central processing unit (CPU) 1010, memory 1020, a mass storage device 1030, a network interface 1050, and an I/O interface 1060 connected to a bus 1040.

The bus 1040 may be one or more of any type of several bus architectures including a memory bus or memory controller, a peripheral bus, video bus, or the like. The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs.

The mass storage device 1030 may comprise any type of storage device configured to store data, programs, and other information and to make the data, programs, and other information accessible via the bus 1040. The mass storage device 1030 may comprise, for example, one or more of a solid state drive, hard disk drive, a magnetic disk drive, an optical disk drive, or the like.

The I/O interface 1060 may provide interfaces to couple external input and output devices to the processing unit 1001. The I/O interface 1060 may include a video adapter. Examples of input and output devices may include a display coupled to the video adapter and a mouse/keyboard/printer coupled to the I/O interface. Other devices may be coupled to the processing unit 1001, and additional or fewer interface cards may be utilized. For example, a serial interface such as Universal Serial Bus (USB) (not shown) may be used to provide an interface for a printer.

The processing unit 1001 may also include one or more network interfaces 1050, which may comprise wired links, such as an Ethernet cable or the like, and/or wireless links to access nodes or different networks. The network interface 1001 allows the processing unit to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in a wireless local area network (LAN) for interference alignment, the wireless LAN having a plurality of access points (APs), the method comprising:
   instructing a first AP of the plurality of APs, the first AP having a plurality of antennae and a transmission stream per 2 antennae, to broadcast a null data packet (NDP) sounding packet to a plurality of stations when no other AP in the plurality of APs is broadcasting, wherein the NDP sounding packet comprises a plurality of long training fields (LTFs), and wherein a total number of LTFs for the NDP sounding packet is equal to a total number of transmission streams per AP;
   receiving channel beamforming (BF) information and a signal plus interference to noise ratio (SINR) from each of the plurality of stations, wherein each of the plurality of stations computes the channel BF information and the SINR from at least the NDP sounding packet; and determining a transmission schedule according to the SINRs and the channel BF information.

2. The method of claim 1 wherein the channel BF information comprises pre-coder candidates and further comprising computing a sum-rate according to the SINRs and the pre-coder candidates and selecting a one of the pre-coder candidates that provides a best sum-rate.

3. The method of claim 1, further comprising grouping the stations according to a preferred pre-coder index, wherein each station provides a corresponding preferred pre-coder index in response to the NDP sounding packet.

4. The method of claim 3, wherein stations with a same preferred pre-coder are grouped together.

5. The method of claim 3, further comprising comparing the SINRs per stream in a group and selecting a station from the group that provides a best SINR.

6. The method of claim 5, further comprising:
recomputing a sum-rate in each group based on a selected station in each group and the selected station's corresponding SINR;
selecting a group that provides a best sum-rate;
selecting a pre-coder corresponding to the selected group; and
scheduling the stations in the selected group from two APs.

7. The method of claim 6, further comprising forming a beamforming matrix for the two APs, wherein a one column corresponds to a first beamforming vector for a first one of the two APs and a second column corresponds to a second beamforming vector for a second one of the two APs.

8. The method of claim 1, wherein the determining a transmission schedule comprises determining a V matrix is determined from singular value decomposition (SVD) of estimated effective channels that are angle-quantized by the stations.

9. The method of claim 1, wherein multiple APs operate in a same frequency band in the wireless LAN.

10. The method of claim 1, wherein the channel BF information comprises one of channel state information and channel quality information.

11. The method of claim 1, wherein the channel BF information comprises angle quantization based BF feedback and further comprising performing a Channel-Nulling or Eigen Beam-forming (EGB) method using the angle quantization based BF feedback.

12. The method of claim 11, further comprising determining a V matrix for Eigen vectors and an S vector determined from singular values according to the angle quantization based BF feedback.

13. The method of claim 11, wherein a number of singular values is equal to the total number of transmission streams.

14. The method of claim 1, further comprising:
instructing two or more APs from the plurality of APs to transmit a data packet to one of the stations, wherein a number of LTFs for the data packet is equal to a total number of transmission streams across the two or more APs.

15. A processing system configured for interference alignment in a wireless local area network (LAN) comprising:
a processor; and
a non-transitory computer readable storage medium storing programming for execution by the processor, the programming including instructions to:
instruct a first access point (AP) of a plurality of APs, the first AP having a plurality of antennae and a transmission stream per 2 antennae, to broadcast a null data packet (NDP) sounding packet to a plurality of stations when no other AP in the plurality of APs is broadcasting, wherein the NDP sounding packet comprises a plurality of long training fields (LTFs), and wherein a total number of LTFs for the NDP sounding packet is equal to a total number of transmission streams per AP;
receive channel beamforming (BF) information and a signal plus interference to noise ratio (SINR) from each of the plurality of stations, wherein each of the plurality of stations computes the channel BF information and the SINR from at least the NDP sounding packet; and
determine a transmission schedule according to the SINRs and the channel BF information.

16. The processing system of claim 15 wherein the channel BF information comprises pre-coder candidates and wherein the instructions further comprise instructions to compute a sum-rate according to the SINRs and the pre-coder candidates and to select a one of the pre-coder candidates that provides a best sum-rate.

17. The processing system of claim 15, wherein the processing system comprises a master AP, wherein the master AP is one of the plurality of APs.

18. The processing system of claim 15, wherein the processing system comprises a backhaul controller.

19. The processing system of claim 15, wherein the instructions further comprise instructions to group the stations according to a preferred pre-coder index, wherein each station provides a corresponding preferred pre-coder index in response to the NDP sounding packet.

20. The processing system of claim 19, wherein stations with a same preferred pre-coder are grouped together.

21. The processing system of claim 19, wherein the instructions further comprise instructions to compare the SINRs per stream in a group and to select a station from the group that provides a best SINR.

22. The processing system of claim 21, wherein the instructions further comprise instructions to:
recompute a sum-rate in each group based on a selected station in each group and a selected station's corresponding SINR;
select a group that provides a best sum-rate;
select a pre-coder corresponding to the selected group; and
schedule the stations in the selected group from two APs.

23. The processing system of claim 22, wherein the instructions further comprise instructions to form a beamforming matrix for the two APs, wherein a one column corresponds to a first beamforming vector for a first one of the two APs and a second column corresponds to a second beamforming vector for a second one of the two APs.

24. The processing system of claim 15, wherein the instructions to determine a transmission schedule comprises instructions to determine a V matrix is determined from singular value decomposition (SVD) of estimated effective channels that are angle-quantized by the stations.

25. The processing system of claim 15, wherein multiple APs operate in a same frequency band in the wireless LAN.

26. The processing system of claim 15, wherein the channel BF information comprises one of channel state information and channel quality information.

27. The processing system of claim 15, wherein the instructions further comprise instructions to:
instruct two or more APs from the plurality of APs to transmit a data packet to one of the stations, wherein a number of LTFs for the data packet is equal to a total number of transmission streams across the two or more APs.

* * * * *